United States Patent [19]  [11] 3,708,981
Johswich et al.  [45] Jan. 9, 1973

[54] ADSORPTION METHOD AND APPARATUS FOR TREATING POLLUTED GAS STREAMS

[75] Inventors: Friedrich Johswich, Essen-Sud; Werner Schindelbeck, Lovenich, both of Germany

[73] Assignee: Chemiebau Dr. A. Zieren GmbH & Co. KG, Koln-Braunsfeld, Germany

[22] Filed: Sept. 11, 1970

[21] Appl. No.: 71,511

[30] Foreign Application Priority Data

Sept. 13, 1969 Germany..................P 19 46 457.4

[52] U.S. Cl.............................................55/73, 55/390
[51] Int. Cl. ...............................................B01d 53/06
[58] Field of Search................55/34, 73, 77, 79, 390; 23/284, 288 G; 34/171, 174

[56] References Cited

UNITED STATES PATENTS

| | | |
|---|---|---|
| 2,849,806 | 9/1958 | Grahek..................................34/174 |
| 3,405,508 | 10/1968 | Peters et al..............................55/73 |
| 1,787,878 | 1/1931 | Warden-Stevens....................34/174 |
| 1,895,601 | 1/1933 | Beuthner...............................55/390 |
| 2,635,575 | 4/1953 | Watson ...................................55/79 |

Primary Examiner—Charles N. Hart
Attorney—Millen, Raptes & White

[57] ABSTRACT

Gas-solid contact method and apparatus, especially apparatus for the adsorption of sulfur oxides from flue gas on a downwardly moving bed of granular carbon-containing adsorbent, said apparatus being provided with an adsorbent containing vessel having opposed perforate vertical walls for gas flow, each of said walls comprising a. a vertical row of louvers disposed in a jalousie-type relationship, each of said louvers being inclined upwardly, and outwardly from the axis of the vessel, said louvers being substantially parallel to one another, and b. a vertical row of baffles arranged at the inner side of said wall adjacent to and behind said louvers, said baffles being substantially parallel to said louvers.

10 Claims, 2 Drawing Figures

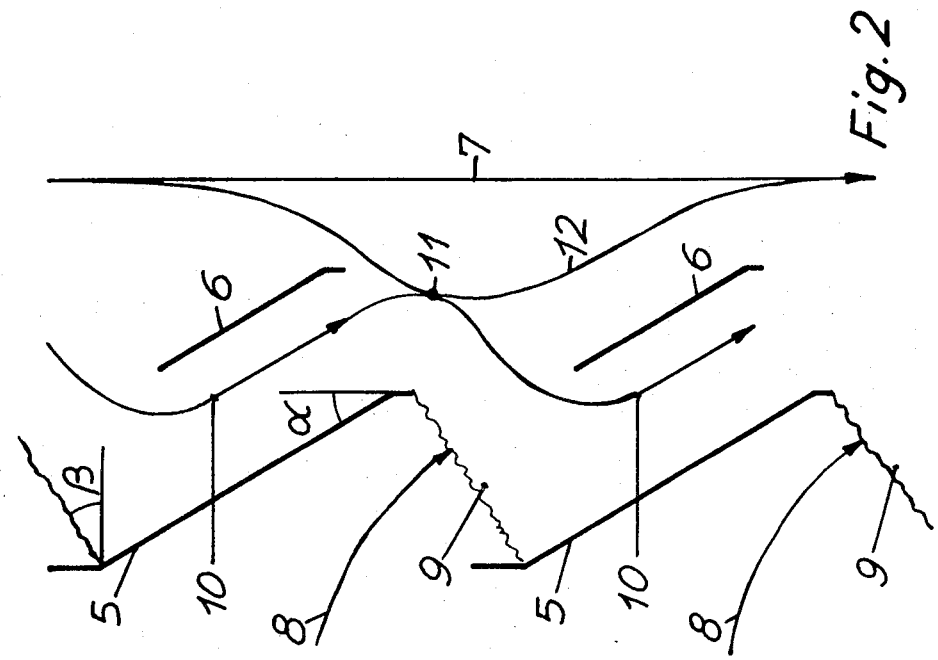
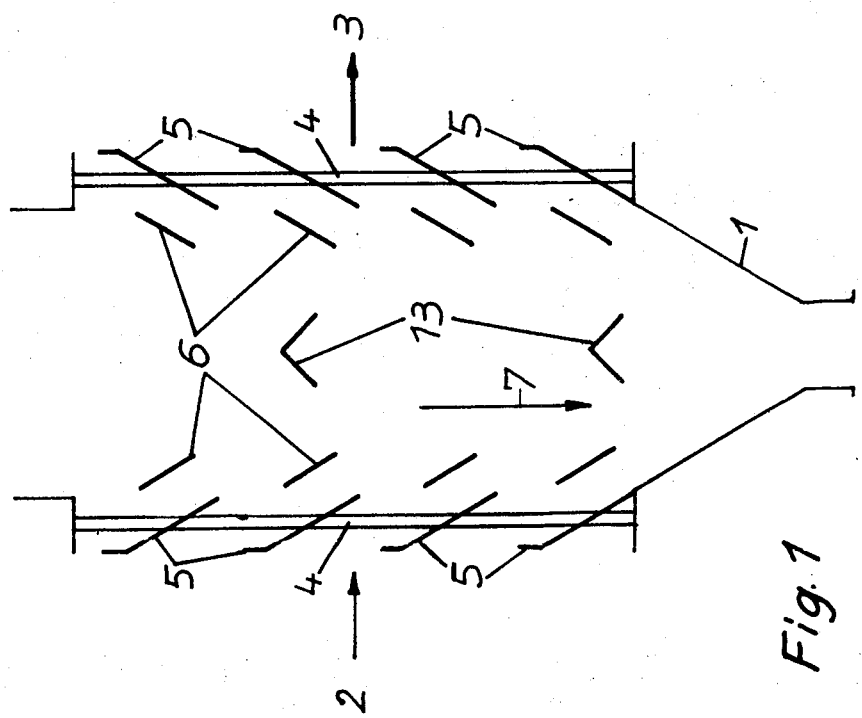

ADSORPTION METHOD AND APPARATUS FOR TREATING POLLUTED GAS STREAMS

BACKGROUND OF THE INVENTION

This invention relates to moving-bed, gas-solid contact method and apparatus, and in particular to such apparatus especially suitable for the adsorption of sulfur oxides and/or nitrogen oxides from industrial waste gases, especially flue gas, on carbon-containing adsorbents.

In the chemical industry, it is common to employ a set of interchangeable fixed bed adsorbers for selective adsorption of one or more components from gaseous mixtures. For the adsorptive purification of very large quantities of gas, however, for example in the adsorption of sulfur oxides or nitrogen oxides, from flue gas or other waste gases, it is better to conduct the adsorbent continuously through the adsorption and desorption zones. Apparatus for conducting a continuous operation can consist of at least one adsorber comprising a gravity flow vessel through which a moving bed of the adsorbent travels from top to bottom. The mutually opposite vertical walls of the vessel are gas-permeable and spaced a short distance from each other, as compared to the length and height of the vessel, thereby enabling the adsorbent to flow downwardly at a substantially uniform rate in direction perpendicular to the flow of the gas. Such apparatus is disclosed in German Patent Application B 6570, Class 12e, 3/02.

In the adsorber described in said application, the walls serving for the passage of gas are provided with holes longitudinally slotted at right angles to the direction of the flow of adsorbent, the boundary lines of these holes lying in a plane inclined obliquely with respect to the wall. Such a perforated metal sheet is usually made of the so-called expanded metal. However, it was found that such expanded-metal walls are gradually clogged, especially when dust-containing gases are treated. Accordingly, the adsorbers must be cleaned periodically. This is not only a relatively expensive and laborious procedure, but it also involves downtime of the adsorber as well as potential disruptions in the process.

SUMMARY OF THE INVENTION

With a view towards improving adsorbers of the prior art, especially towards mitigating the problem associated with the adsorber described in the German application, it is an object of this invention to provide a novel adsorption vessel.

In particular, it is an object to provide adsorption method and apparatus having at least one vertically disposed container for the adsorbent with transverse perforate entrance and exit sides for gas flow. The apparatus is to operate with dust-containing gases and/or with abrasive adsorbents, with little or no clogging of the wall perforations. Furthermore, the apparatus is to permit, in its preferred form, a substantially uniform downward flow of the adsorbent over the entire cross section of the adsorbent container, resulting in a substantially uniform residence time and load for the adsorbent.

Upon further study of the specification and appended claims, other objects and advantages of the present invention will become apparent.

To attain these objects, the perforated vessel wall comprises a row of louvers downwardly inclined from the outside toward the inside in substantially parallel relationship, and arranged in the manner of a jalousie one above the other. Spaced behind, and adjacent to these louvers, there is provided a second row of baffles. To appreciate the function of this combination of louvers and baffles, the operation of the of the adsorber is first explained, assuming that the baffles are absent.

The finely divided adsorbent flowing downwardly in the vessel similarly to a liquid, exerts a lateral pressure, forcing the adsorbent into the spaces between the louvers. Since the static pressure resulting from the flow in the interior of the vessel is considerably higher than the back pressure resulting from the weight of the minor amount of adsorbent, disposed in between the louvers, said minor amount of adsorbent remains substantially stationary and does not flow through the vessel with the main body of adsorbent. This means that incoming gas containing solid dust-like entrainment would meet a stationary layer of adsorbent between the louvers and deposit the solid entrained material, thereby resulting in the stationary layer being rapidly clogged.

By providing the baffles, the flow of the adsorbent is changed markedly. In effect, the baffles absorb the static lateral pressure of the downwardly flowing adsorbent and protect that minor portion of the adsorbent between the louvers from being exposed to the lateral pressure, thereby permitting that minor portion to combine with the main flow of the adsorbent. The cooperation between louvers and pressure relief baffles thus ensures a continuous flow of adsorbent in the zone of the louvers, thereby removing a stationary adsorbent phase between adjacent louvers. Thus, the dust taken up by the outermost layer of adsorbent is entrained continuously into the main stream, together with the adsorbent, so that clogging of the interspaces between the granules of this layer due to the deposition of dust is well nigh impossible.

In accordance with the preferred embodiment of the invention, a pressure relief baffle is associated with each louver. The baffle is generally narrower than the louver by about 40 to 80, preferably 50 to 70 percent, and is arranged, with respect to the louver, in such a manner that the side pressure on the lower zone of the volume of adsorbent disposed between two adjacent guide baffles is completely or substantially completely absorbed. The layer of adsorbent in the pressure-relieved space between the louver and relief baffle is then free to fall, aided by the flow of gas through the adsorber.

Preferably, the baffles are disposed substantially parallel with respect to the louvers. The space between the baffle and louver then is not subjected to any constriction in the direction of flow, which would otherwise impede the discharge of the dust-laden adsorbent. On the other had, the baffles must extend only a limited distance into the main flow of the adsorbent so as not to deleteriously impair this flow. For example, where the space between the perforate vertical walls is 0.85 meters, the distance between the louvers and associated baffles is about 6 to 9, preferably 7.5 to 8.5 centimeters.

The louvers themselves are also disposed substantially parallel with respect to one another. The overlapping of the louvers is arranged so that the adsorbent slopingly passing under the bottom edge of a louver does not flow over the upper edge of the next-lower louver.

Advantageously, the upper edge of each baffle is disposed vertically underneath the bottom edge of the next-higher louver. In this manner, it is ensured that the adsorbent flowing downwardly between the louver and the pressure relief baffle is deflected at least partially by the next-lower baffle toward the mainstream, thereby preventing an excessive dust accumulation in the sidestream between the louver and baffle.

Suitably, the inclination $\alpha$ of the guide baffles with respect to the axis of the container is smaller than the sloping angle $\beta$ of the adsorbent. By sloping angle $\beta$ is meant the angle of repose at which solids can be stored without a landslide.

The angle $\alpha$ can be changed by providing adjustable hinged sets of louvers and baffles, depending on the nature of the adsorbent and other process factors. Generally, however, this angle $\alpha$ is set at about 25° to 35°, preferably 27° to 32°. Also, the distance between the bottom edge of one louver and the top edge of the next lower louver is generally about 20 to 60, preferably about 35 to 45 cm.

Under the above conditions, the space between the louvers and baffle is fully utilized for the flow of adsorbent.

In a further and preferred embodiment of the invention, the adsorbent vessel is provided with at least one means for decelerating the main flow of adsorbent. Such means is arranged approximately in the center between the center of the opposed perforated vessel walls. This decelerating means is preferably in the form of a guide-like obstruction generally convex to the downward flow of adsorbent. This guide prevents the falling speed of the adsorbent in the middle of the main body of adsorbent from becoming higher than in the boundary zones near the perforated vessel walls, where the velocity is somewhat lower owing to the obstructions. In this way, the residence time of the adsorbent in the vessel is made more uniform, and the overall capacity of the adsorbent is utilized more efficiently. Preferably, the guide element or elements in the center of the vessel are designed in the shape of a gabled roof or as substantially horizontal tubes. Thereby, the peak of the falling velocity in the center of the velocity profile is reduced without a substantial increase in the flow resistance of the gas.

BRIEF DESCRIPTION OF THE DRAWINGS

FIG. 1 depicts a longitudinal section through the adsorption apparatus of this invention with the rows of louvers and baffles disposed on the upstream and downstream sides.

FIG. 2 shows the guide and relief baffles on an enlarged scale, with the flow curve of the adsorbent indicated by arrows.

DETAILED DESCRIPTION OF THE DRAWINGS

FIG. 1 illustrates an adsorber vessel 1, the walls thereof being designed according to this invention both on the entrance upstream side 2 and the exit downstream side 3. These walls consist of vertical struts 4 to which are attached a large number of louvers 5 in a position inclined with respect to the center of the vessel 1. Behind each louver 5, a baffle 6 is spaced in parallel to the inner side thereof. The adsorbent slides downwardly in the vessel between the baffles 6 according to the direction of arrow 7, and the gas to treated flows transversely through this adsorbent. The louvers 13 serve to decelerate the falling speed of the adsorbent between the top inlet and the bottom outlet of the vessel, thereby permitting a uniform residence time for the adsorbent.

The flow of adsorbent at the wall can be seen more clearly from FIG. 2. The gas to be treated enters, in accordance with the arrows 8, into the vessel between the louvers 5. During this process, the gas first flows through a layer 9 of adsorbent wherein a substantial portion of the dust contained in the gas is separated. The dust-laden adsorbent continuously travels downwardly in a tortuous path between the louvers 5 and the baffles 6, according to the arrow 10. In each instance, at point 11, a portion of the dust-laden adsorbent is transferred from the wall stream 10 into the mainstream 12, 7, while, from the mainstream 7, a portion of the adsorbent passes over into the wall stream 10. Due to the continuous transverse movement of the layers 9 of adsorbent and the exchange of adsorbent between the wall stream 10 and the mainstream 7, the passage of gas is not impaired by an excessive deposition of dust particles in the outermost layers of the adsorbent. For a description of the auxiliary equipment that can be used with the illustrated adsorption apparatus, reference is invited to U.S. Pat. No. 3,284,158.

The invention is not limited to the illustrated embodiment, but extends to all gas-solid contact devices benefitted by a non-stationary, non-cloggable movement of solids at the wall of the vessel containing the solids, e.g. chemical reactors, coolers, dryers, heaters and adsorbers. Of particular application, however, is the adsorption treatment of flue gas containing at least 115 ppm by weight of finely divided solids.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

In this connection, it is to be noted that the baffles of the invention are substantially to completely co-extensive in length with the louvers; otherwise, the baffles would not be able to absorb the lateral pressure of the moving bed.

The process wherein a carbon-containing adsorbent is employed to treat flue gas is described in U.S. Pat. Nos. 2,992,065 and 2,992,895.

What is claimed is:

1. In gas-solid contact apparatus comprising a vertically disposed vessel having a perforate transverse wall for the flow of gas, the improvement wherein said wall comprises:

a. a vertical row of louvers, each of said louvers being inclined upwardly, and outwardly from the axis of the vessel, said louvers being substantially parallel to one another and defining permanent openings therebetween to permit gas to enter said vessel, and b. a vertical row of baffles arranged at the inner side of said wall adjacent to and behind said louvers, said baffles being substantially parallel to said louvers and defining a tortuous path between the louvers and baffles for adsorbent material moving downwardly therethrough.

2. Apparatus according to claim 1, wherein the top edge of each baffle is disposed vertically underneath the bottom edge of the next-higher louver.

3. Apparatus according to claim 1, said vessel comprising two of said transverse walls, said walls being opposite to one another.

4. Apparatus according to claim 1, further comprising at least one guide means disposed approximately in the center between said opposed perforate vessel walls, said means being for decelerating falling solids.

5. Adsorption apparatus according to claim 4, wherein the guide element is in the shape of a gabled roof.

6. Apparatus according to claim 1, said baffles being essentially permanently positioned during operation of the apparatus, and having a set angle of inclination with respect to the axis of the vessel.

7. Apparatus as defined by claim 6 wherein said set angle of inclination is 25°–35°.

8. In a process of purifying flue gas containing sulfur oxides, which process comprises passing a downwardly moving bed of carbon-containing adsorbent through a vertically disposed vessel having a perforate transverse wall, and passing said flue gas through said perforate transverse wall into said downwardly-moving bed of adsorbent, the improvement which comprises passing a portion of said downwardly moving bed in a tortuous path defined by (a) parallel permanently open louvers inclined upwardly and outwardly in said transverse wall, and (b) a vertical row of baffles arranged at the inner side of said wall adjacent to and behind said louvers, said baffles being substantially parallel to said louvers.

9. A process as defined by claim 8 wherein said baffles are inclined at an angle of about 25°–35° with respect to the axis of the vessel.

10. A process as defined by claim 9 wherein said baffles are inclined at an angle of about 27°–32°

* * * * *